United States Patent [19]
Imbert et al.

[11] 3,719,837
[45] March 6, 1973

[54] THERMOIONIC CONVERTER WITH PLURAL SOLID RESERVOIRS

[75] Inventors: Francis Imbert; Arvind Shroff, both of Paris, France

[73] Assignee: Thomson-CSF, Paris, France

[22] Filed: Feb. 18, 1971

[21] Appl. No.: 116,579

[30] Foreign Application Priority Data

Feb. 24, 1970 France..............................7006596

[52] U.S. Cl.................................................310/4
[51] Int. Cl................................................H01j 45/00
[58] Field of Search.......................................310/4

[56] References Cited

UNITED STATES PATENTS

| | | | |
|---|---|---|---|
| 3,144,569 | 8/1964 | Coles | 310/4 |
| 3,300,661 | 1/1967 | Talaat | 310/4 |
| 3,426,221 | 2/1969 | Harbaugh | 310/4 |
| 3,452,224 | 6/1969 | Hernquist et al. | 310/4 |
| 3,454,797 | 7/1969 | Devin et al. | 310/4 |

Primary Examiner—D. F. Duggan
Attorney—Cushman, Darby & Cushman

[57] ABSTRACT

Self - regulating reservoir for ionizable material, incorporated in a thermoionic converter, having a two-stage structure, one stage masking the other, in which the masked section, of large capacity but poor regulating ability, constantly feeds the masking section, of small capacity, but good regulating ability.

7 Claims, 3 Drawing Figures

THERMOIONIC CONVERTER WITH PLURAL SOLID RESERVOIRS

The present invention relates the thermoionic converters, and more particularly to a novel type of vaporized metal source, or "reservoir," for such converters.

Generally speaking, such converters, are in the form of sealed diodes with two electrodes, one of which is heated and emits electrons whilst the other is cold and collects these electrons, this giving rise to a current flow in an external circuit which connects there electrodes to a load.

In order to counteract the mutual repulsion which occurs within the electron cloud thus emitted, and thus limits the emission, there is introduced into the diode a vapor of a readily ionizable metal, such as cesium, the positive ions of which neutralize the negative charges of the electrons and thus enable higher currents to be obtained.

In known converter diodes, the cesium reservoir is disposed externally of the diode and communicates with it through a fine tube which acts as a thermal link of high thermal resistance, and the respective temperatures of the emissive electrodes of the diode and the reservoir are separately regulated for optimally adjusting the operating parameters of the diode.

To avoid this two-part structure, and certain drawbacks inherent thereto, it has been suggested, in a copending Patent application for "Thermoionic converter" Ser. No. 70,065,96 filed Feb., 24, 1970 and assigned to the same Assignee, to provide in the converter a block of adsorptive material in which readily ionizable substance, such as cesium, is stored.

However, such a structure has other drawbacks. In particular it does not allow the independent regulation of the reservoir temperature and of the diode temperature, so that there is an interrelation between temperature and pressure inside the converter diode.

The maintenance of optimum operation conditions in the diode requires that there shall be self-regulation of pressure and temperature in accordance with an appropriate law.

Of course the adsorbant material used, determines the way in which the ionizable metal vapor is liberated or adsorbed as a function of temperature. Furthermore, it is necessary that the quantity of metal stored in the porous block in the adsorbed form, shall be sufficient to supply the converter in operation.

However, known bodies which could be used for this purpose belong to two categories, neither of which satisfactorily fulfills both conditions.

For example, fritted refractory metals, essentially tungsten or molybdenum, enable good self-regulation to be achieved due to the fact that the slope of their pressure-temperature curve is variable as a function of their equivalent surface, so that by making a suitable choice of this surface, it is possible to adjust the slope to accord with the desired pressure. However, they do not enable a sufficient reserve of cesium to be stored.

By contrast, graphite and carbonaceous adsorbents enable a large cesium reserve to be stored, sufficient for example to permit an operational life in excess of 10,000 hours, but the law of variation of pressure as a function of temperature is such as to provide only mediocre self-regulation.

It is an object of this invention to provide an improved metal vapor source which does not exhibit these drawbacks but combines the advantages of both the known arrangements.

According to the invention there is provided a self-regulating reservoir of ionizable metal, for a thermoionic converter, which is raised to its operational temperature at least partly by the heat energy applied to said converter, comprising two blocks located within the envelope of the converter, said blocks being made of different materials, and having a large developed surface area, said ionizable metal being fixed there by surface effect, one of the blocks completely masking the other.

The invention will be better understood from the ensuing description and the attached Figures in which.

Figure 1:
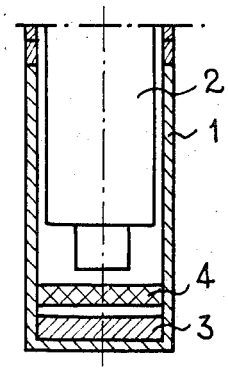
FIG. 1 illustrates a structure in accordance with the invention.

The structure containing ionizable metal, cesium for example, in accordance with the invention, is shown in FIG. 1. It is located in the sealed envelope of a thermoionic converter of conventional design, only the relevant part of which has been illustrated, in order not to overburden the drawing. The envelope 1 of the converter diode forms the collector electrode, and the electrode 2, which is the emitter, is located within this envelope. At the bottom part of the Figure the cesium reservoir in accordance with the invention can be seen. The letter is formed by two superimposed blocks or "sponges" : the bottom large-volume sponge 3 is made of pyrolytic graphite and forms the cesium reservoir proper ; the top sponge 4 of small volume and thickness, is made of porous tungsten, for example by sintering or fritting.

The porosity of this block is quite precisely defined (between 17 and 21 percent for example) and in typical cases the block exhibits an adsorptive area of 0.1 to 1m$^2$ . The operation of this storing system is as follows : with the reservoir raised to a given temperature, a given cesium pressure prevails in the interelectrode space. If, in the course of the converter operation, the cesium consumption varies, increases for example, any such variation will be compensated for by the distillation of fresh cesium molecules from the upper tungsten sponge whose self-regulating action will thus come into effect ; it relatively low adsorptive capacity will not result in any problem because the underlying large capacity sponge will feed it so that the upper larger 4 remains cesium-satured throughout . Thus automatic regulation of the internal pressure of the converter diode will be achieved.

Figure 2:
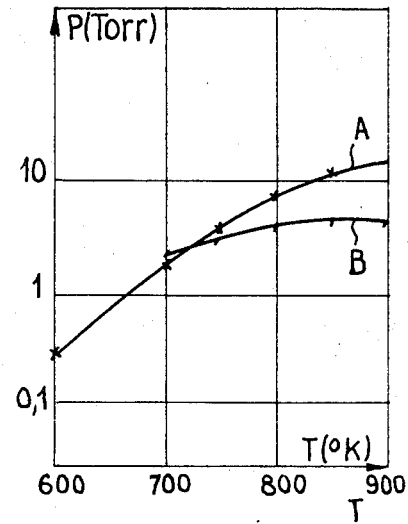

FIG. 2 illustrates curves showing, for a better understanding of the operation, the variations in pressure as a function of temperature, for a given volume of envelope which is typically in the order of between 3 and 5 cm$^3$, in the respective cases of the materials 3 and 4. Curve A relates to the graphite sponge 3 ; it will be observed that the variation of pressure as a function of temperature is rapid and results in mediocre regulation. Curve B relates to the tungsten sponge 3 ; its slope is moderate, which results in good regulation as a function of temperature.

In selecting an operating pressure and temperature, it is necessary that, at the corresponding operating point, the two curves should be close to one another since what is required is a fine regulating mechanism about a mean working point.

Figure 3:
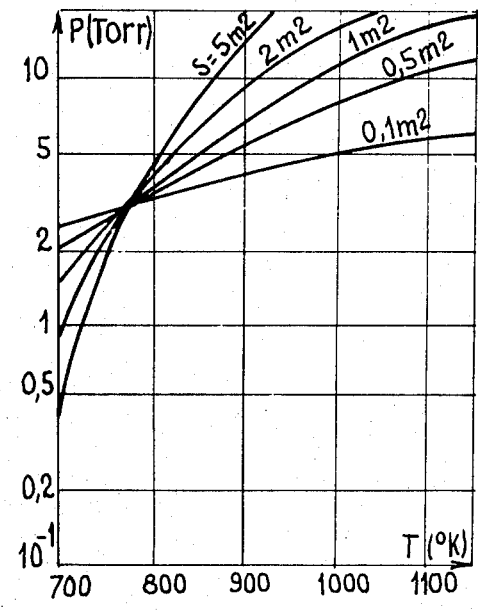
FIGS. 2 and 3 are explanatory graphs.

FIG.3, in which the axes are the same as in FIG.2, relates to the same volume. The family of curves plotted relates to tungsten and the curves are given by way of example to provide a better understanding of the way to determine optimum adsorptive area.

It will be seen that the effective area governs the slope of the curves in a decisive manner and that, by suitable selection of this area, it is easy to obtain the requisite optimum slope for the desired operation of the upper sponge.

In the course of the work which related to the present invention, the following typical results, which are given here purely by way of example, were obtained : for a temperature variation of some 100° around 800° K, the internal cesium pressure varied by only 1 to 2 mm/Hg ; if compared with the case of liquid cesium, the same temperature variation would have produced a variation of around 30 mm/Hg, something which would have severely jeopardized the operation of the thermoionic converter.

Of course the invention is not limited to the embodiments described and shown, which there given solely by way of example.

What is claimed, is :

1. A self-regulating reservoir of ionizable metal, for a thermoionic converter, which is raised to its operational temperature at least partly by the heat energy applied to said converter, comprising two blocks located within the envelope of the converter, said blocks being made of different materials, and having a large developed surface area, said ionizable metal being fixed there by surface effect, one of the blocks completely masking the other.

2. A reservoir as claimed in claim 1, in which the masked block is constituted by a porous carbon-bearing material.

3. A reservoir as claimed in claim 2, in which said material is pyrolytic graphite.

4. A reservoir as claimed in claim 1, in which said masking block is constituted by a porous tungsten-bearing material.

5. A reservoir as claimed in claim 1, in which said masking block is constituted by a porous molybdenum - bearing material.

6. A reservoir as claimed in claim 1, in which the ionizable metal is cesium.

7. A thermoionic converter comprising a self-regulating reservoir of metal, as claimed in claim 1.

* * * * *